US011439228B2

(12) United States Patent
Gao et al.

(10) Patent No.: US 11,439,228 B2
(45) Date of Patent: Sep. 13, 2022

(54) METHOD AND UNIT FOR CONTROLLING SAFE OPERATION OF AN ELECTRIC TABLE

(71) Applicant: Changzhou Kaidi Electrical Co., Ltd., Changzhou (CN)

(72) Inventors: Gangqiang Gao, Changzhou (CN); Jing Cao, Changzhou (CN); Fa Zhao, Changzhou (CN)

(73) Assignee: CHANGZHOU KAIDI ELECTRICAL CO., LTD., Changzhou (CN)

( * ) Notice: Subject to any disclaimer, the term of this patent is extended or adjusted under 35 U.S.C. 154(b) by 0 days.

(21) Appl. No.: 17/136,423

(22) Filed: Dec. 29, 2020

(65) Prior Publication Data

US 2021/0282546 A1 Sep. 16, 2021

(30) Foreign Application Priority Data

Mar. 13, 2020 (CN) .......................... 202010172828.0

(51) Int. Cl.
*A47B 9/00* (2006.01)
*G05B 15/02* (2006.01)

(52) U.S. Cl.
CPC ................ *A47B 9/00* (2013.01); *G05B 15/02* (2013.01); *A47B 2200/006* (2013.01); *A47B 2200/0061* (2013.01)

(58) Field of Classification Search
CPC ................ A47B 9/00; A47B 2200/006; A47B 2200/0061; A47B 2200/0057; A47B 2200/0062; A47B 2200/0056; G05B 15/02

USPC ................ 700/22; 108/147, 144.11, 147.19, 108/147.22; 248/188.1, 188.5, 188.8
See application file for complete search history.

(56) References Cited

U.S. PATENT DOCUMENTS

| | | | | |
|---|---|---|---|---|
| 7,661,292 B2* | 2/2010 | Buitmann | ................ | A47B 9/00 73/12.01 |
| 10,912,380 B1* | 2/2021 | Lu | ........................... | G01P 13/00 |
| 11,206,920 B2* | 12/2021 | Riebner | .................. | A47B 9/00 |

(Continued)

FOREIGN PATENT DOCUMENTS

| | | | |
|---|---|---|---|
| CN | 207115083 | * | 3/2018 |
| EP | 3662786 | * | 6/2020 |

(Continued)

*Primary Examiner* — Janet M Wilkens
(74) *Attorney, Agent, or Firm* — WPAT, PC

(57) ABSTRACT

A method for controlling safe operation of an electric table includes: starting the default setting value or self-set setting value of a sensor unit stored in a memory after power-on; making sure that an electric control module activates the sensor unit when the electric table is raised or lowered, and the sensor unit detects the vibration amplitude of the electric table and records the number of vibrations when the vibration amplitude exceeds the setting value; when the recorded number of vibrations is greater than the default setting value or self-set setting value, the electric control module controls a power mechanism on the electric table to make a rebound action in the opposite direction when the electric table is raised or lowered. Acceleration and gyroscope sensors are vertically installed on a small board, so that the sensitivity of the gyroscope to vibration detection is increased.

14 Claims, 3 Drawing Sheets

(56) References Cited

U.S. PATENT DOCUMENTS

| | | | |
|---|---|---|---|
| 2013/0204438 A1* | 8/2013 | Hjelm | A47B 9/00 700/275 |
| 2016/0128467 A1* | 5/2016 | Sigal | A47B 9/00 700/275 |
| 2016/0309889 A1* | 10/2016 | Lin | A47B 9/00 |
| 2016/0353880 A1* | 12/2016 | Sigal | A47B 9/00 |
| 2017/0055720 A1* | 3/2017 | Lin | A47C 20/041 |
| 2017/0135587 A1* | 5/2017 | Desroches | A61B 5/14551 |
| 2018/0020831 A1* | 1/2018 | Lenz | A47C 3/20 297/174 R |
| 2018/0249821 A1* | 9/2018 | Lin | A47B 9/00 |
| 2020/0146440 A1* | 5/2020 | Fogarty | A47B 21/02 |
| 2020/0170407 A1* | 6/2020 | Knapp | A47B 9/00 |
| 2021/0011453 A1* | 1/2021 | Xiang | G01P 15/18 |
| 2021/0145164 A1* | 5/2021 | Lu | A61G 7/018 |
| 2021/0386193 A1* | 12/2021 | Bucquet | A47B 9/00 |

FOREIGN PATENT DOCUMENTS

| | | | |
|---|---|---|---|
| EP | 3878312 | * | 9/2021 |
| WO | 2018223240 | * | 12/2018 |
| WO | 2019149296 | * | 8/2019 |

* cited by examiner

METHOD AND UNIT FOR CONTROLLING SAFE OPERATION OF AN ELECTRIC TABLE

CROSS REFERENCE TO RELATED APPLICATION

This application claims the priority of Chinese Patent Application No. 202010172828.0, entitled "Method and Unit for Controlling Safe Operation of an Electric Table", filed on Mar. 13, 2020, the disclosure of which is incorporated herein by reference in its entirety.

BACKGROUND OF THE INVENTION

1. Field of the Invention

The invention relates to the technical field of safe operation of an electric table, in particular to a method and unit for controlling safe operation of an electric table.

2. Description of Related Art

For the existing electric safety table, after detecting that the inclination angle of the table board reaches a certain degree, the table board will stop moving. For the invention (Application Publication No.: CN 106473449 A and Title: An Electric Table and a Control Method for the Electric Table), in actual use, it is found that the method for detecting the inclination angle of the table board is in a state of lag and unresponsiveness, especially in the following cases. There are obstacles above or below the table board, and the action point of the obstacle and the force bearing point when the table body is raised or lowered are in a balanced position. When the table board abuts against the obstacle, the inclination angle will not shift or be less than 0.3°, and the safety mode will not be started at this time. The most common thing is that a person gets under the table, the table top drops, the back of the human body abuts against the table board, the table board still remains level as a whole, the safety mode of the safety table will not be started, and the probability of this situation is very high. To put it simply, the detection of the inclination angle has low accuracy and insufficient sensitivity and the overall cost of the table is too high due to the use of a high-precision angle detecting unit because most of the safe anti-pinch systems for existing electric tables detect the inclination angle of the table body to realize safe anti-pinch.

SUMMARY OF THE INVENTION

The technical problem to be solved by the invention is to provide a method and unit for controlling safe operation of an electric table, to solve the problems that the detection of the inclination angle has low accuracy and insufficient sensitivity and the overall cost of the table is too high due to the use of a high-precision angle detecting unit because most of the safe anti-pinch systems for existing electric tables detect the inclination angle of the table body to realize safe anti-pinch.

The technical solution adopted by the invention to solve the technical problem is to provide a method for controlling safe operation of an electric table, comprising:

a). recalling the default setting value or self-set setting value of the sensor unit stored in the memory after the system is powered on;

b). keeping the electric control module and the sensor unit in a standby state;

c). making sure that the electric control module activates the sensor unit when the electric table is raised or lowered, and the sensor unit detects the vibration amplitude of the electric table during the raising or lowering and records the number of vibrations when the vibration amplitude exceeds the setting value; when the recorded number of vibrations is greater than the default setting value or self-set setting value, the electric control module controls the power mechanism on the electric table to make an anti-pinch action.

The anti-pinch action specifically means that the electric control module controls the power mechanism on the electric table to make a rebound action in the opposite direction when the electric table is raised or lowered, and the rebound action means that the power mechanism on the electric table drives the electric table to move in the opposite direction when the electric table is raised or lowered for a certain distance.

To improve the accuracy, the sensor unit is a vibration sensor unit comprising an acceleration sensor and a gyroscope sensor, and the acceleration sensor and the gyroscope sensor work simultaneously, the gyroscope sensor measures the physical quantity, i.e., rotational angular velocity when deflecting and tilting, and transmits the measured data to the electric control module; the output of the acceleration sensor is used to correct the output of the gyroscope sensor, so that the output data of the gyroscope sensor is stable within the preset range at rest.

To further improve the anti-pinch effect, the sensor unit further comprises a current sensor, the current sensor detects the current of the power mechanism on the electric table and transmits the detected data to the electric control module, and when the current sensor detects that the current variable of the power mechanism on the electric table exceeds the setting value, the electric control module controls the power mechanism on the electric table to make an anti-pinch action.

Further, the gyroscope sensor detects the number of vibrations when the slope is greater than 80, and transmits the detected number of vibrations to the electric control module, and when the gyroscope sensor detects that the number of vibrations when the slope is greater than 80 exceeds the setting value, the electric control module controls the power mechanism on the electric table to make an anti-pinch action.

To improve the accuracy of detection, the sensor unit is a vibration sensor unit comprising an acceleration sensor and a gyroscope sensor, and the vibration sensor unit detects the vibration of the electric table body and the electric table body comprises a table top and table legs.

To facilitate the adjustment of the rebound distance, the reference object of the rebound action is the table top of the electric table, and the power mechanism drives the table top to rebound by 1~6 cm during the rebound action.

To further improve the anti-pinch effect, the sensor unit is set to realize the anti-pinch action after the gyroscope sensor and/or the current sensor in the sensor unit detects the sudden change signal.

A unit for controlling safe operation of an electric table, comprising an electric control module for controlling the raising or lowering of the electric table and a sensor unit for detecting the data during the operation of the electric table; the sensor unit transmits the detected data to the electric control module and the electric control module controls the power mechanism on the electric table to make an action after processing the received data, wherein the sensor unit is a vibration sensor unit, and the vibration sensor unit detects the vibration data during the operation of the electric table and transmits the detected data to the electric control module.

For convenience, the electric control module comprises a control chip and a memory, the memory is electrically connected with the control chip and transmits the data stored in the memory to the control chip, and the control chip compares the data in the memory with the received data detected by the sensor unit, and then sends corresponding instructions to the power mechanism on the electric table.

To increase the vibration amplitude, the sensor unit is a vibration sensor unit comprising an acceleration sensor and a gyroscope sensor, the acceleration sensor and the gyroscope sensor are installed on a small board, and the small board is vertically arranged on the circuit board where the electric control module is located.

The beneficial effects of the invention are that the unit for controlling safe operation of an electric table provided by the invention uses the gyroscope to calculate the vibration amplitude of the electric table when it is raised or lowered. When the vibration amplitude reaches a certain value, the anti-pinch operation of the motor is triggered. Because the gyroscope is sensitive to vibration, the defect of insufficient sensitivity in the prior art can be solved. The gyroscope is an angular motion detection device that uses the momentum moment sensitive shell of the high-speed rotating body to rotate around one or two axes orthogonal to the rotation axis relative to the inertial space. The angular motion detection device made by other principles is also called the gyroscope, with the same function. The gyroscope is also called the angular velocity sensor and it is different from the accelerometer. The measured physical quantity of the gyroscope is the rotational angular velocity when deflecting and tilting. Therefore, the gyroscope is very sensitive to vibration, and the vibration can be measured well by the gyroscope, and then the motor can be controlled accordingly based on the vibration amplitude. The gyroscope communicates with the MCU in the control unit through the IIC interface. The vibration state of the electric table is detected in real time by the gyroscope. When the abnormal moving posture of the electric table is detected, the table legs are automatically controlled to generate an anti-pinch action. The interface of the gyroscope is the IIC interface. It is a two-wire interface, including data sending and receiving port SDA and clock port SCL. An object is created to detect the changes of gyroscope coordinates and the gyroscope. When the coordinate state of the gyroscope changes, the vibration amplitude of the electric table is calculated in real time. The output of the acceleration sensor is used to correct the output of the gyroscope, so that the output data of the gyroscope is stable within an acceptable range at rest. The anti-pinch force of the invention can be as small as about 10 kg, and the anti-pinch effect is much better than that of the traditional anti-pinch means. The acceleration sensor and the gyroscope sensor are vertically installed on the small board, so that the sensitivity of the gyroscope to vibration detection is increased, and the vibration amplitude is enlarged by 1.5 times compared with the direct installation on the circuit board.

BRIEF DESCRIPTION OF THE DRAWINGS

The invention will be further described below with reference to the drawings and embodiments.

DETAILED DESCRIPTION OF THE PREFERRED EMBODIMENTS

The invention will be further described below with reference to the drawings. The drawings are simplified diagrams illustrating only the basic structure of the invention, and thus, only show the components related to the invention.

Figure 1:
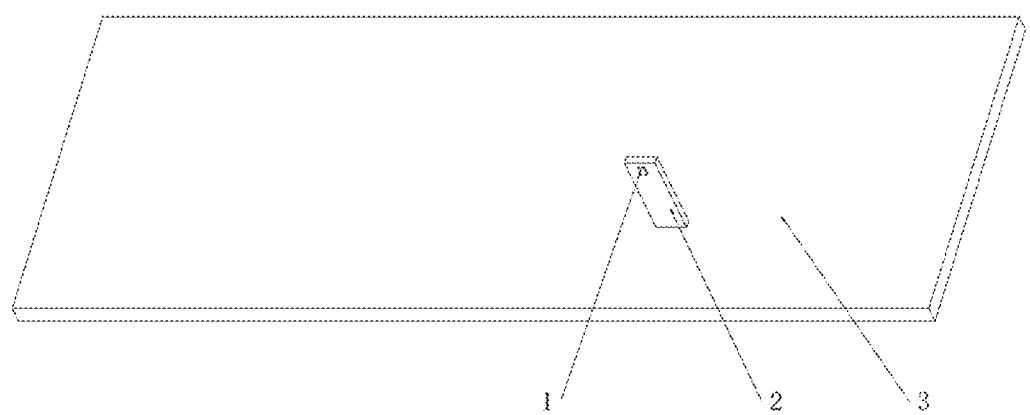
FIG. 1 is a structure diagram of the invention.
Figure 2:
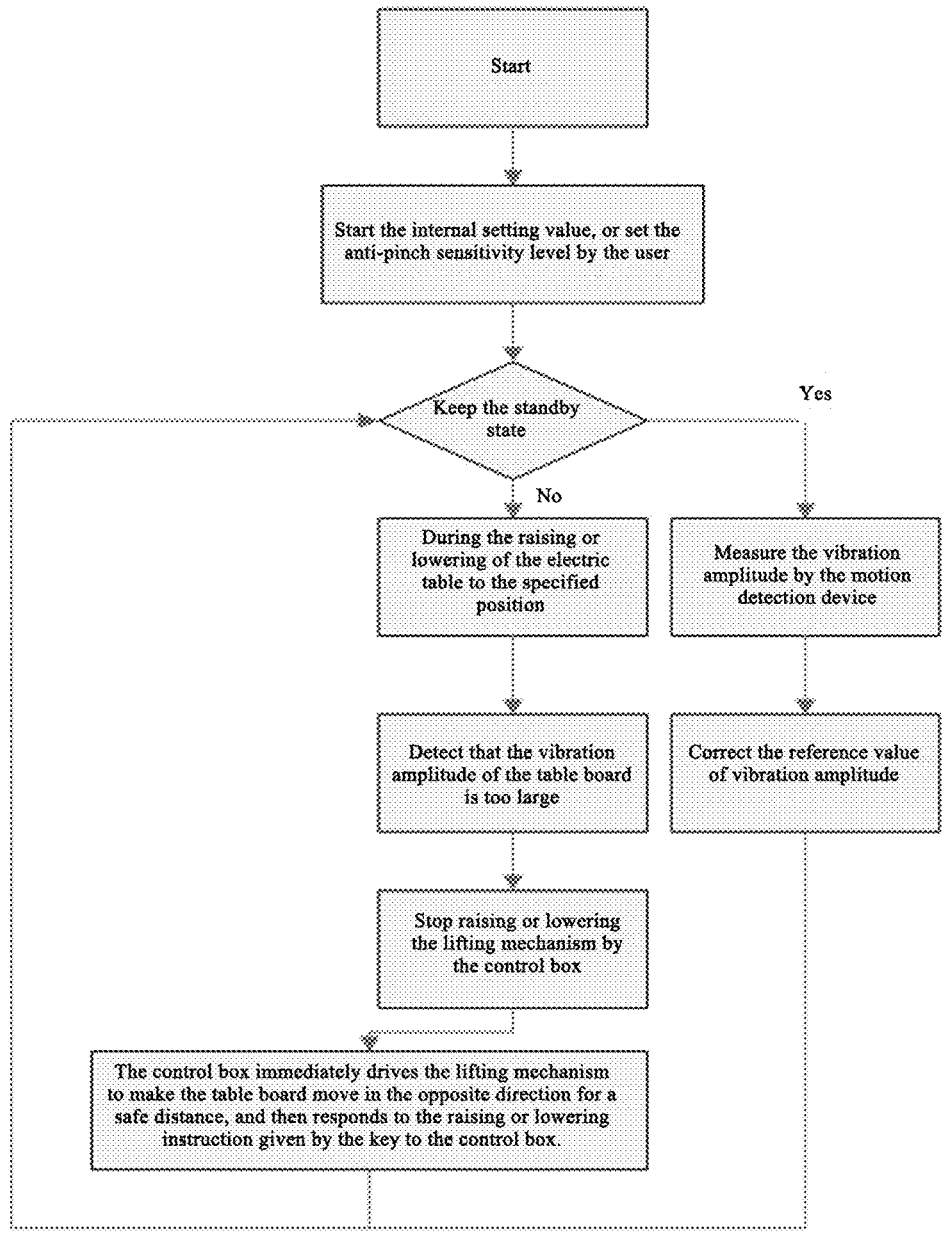
FIG. 2 is a control flow chart of the invention.
Figure 3:
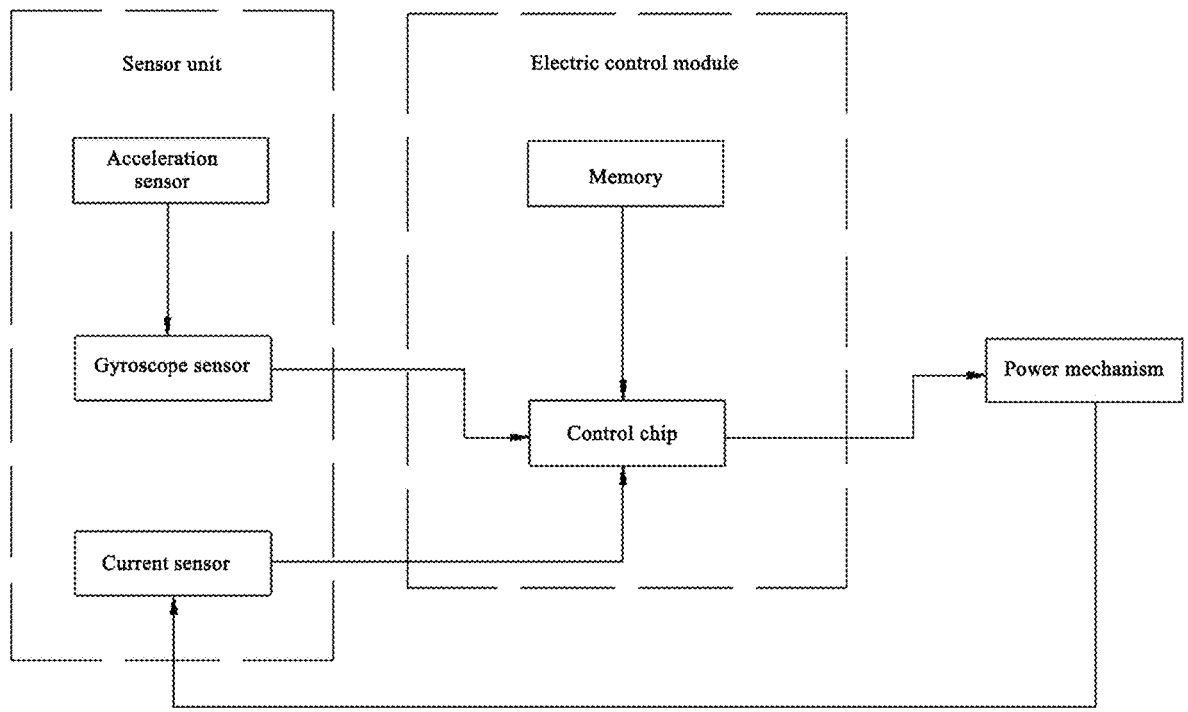
FIG. 3 is a simple circuit diagram of the invention.

FIG. 1 to FIG. 3 show a method and unit for controlling safe operation of an electric table. The unit for controlling safe operation of an electric table comprises an electric control module for controlling the raising or lowering of the electric table and a sensor unit 1 for detecting the data during the operation of the electric table. The sensor unit 1 transmits the detected data to the control chip in the electric control module, and the control chip compares the received data with the default setting value or self-set setting value stored in the memory. The electric control module controls the power mechanism on the electric table to make an anti-pinch action after obtaining the results. The anti-pinch action specifically means that the electric control module controls the power mechanism on the electric table to make a rebound action in the opposite direction when the electric table is raised or lowered, and the rebound action means that the power mechanism on the electric table drives the electric table to move in the opposite direction when the electric table is raised or lowered for a certain distance.

The sensor unit 1 in the invention is a vibration sensor unit. It mainly uses two sensors and comprises an acceleration sensor and a gyroscope sensor, and the acceleration sensor and the gyroscope sensor work simultaneously. The gyroscope sensor measures the physical quantity, i.e., rotational angular velocity when deflecting and tilting, and transmits the measured data to the control chip in the electric control module. The output of the acceleration sensor is used to correct the output of the gyroscope sensor, so that the output data of the gyroscope sensor is stable within the preset range at rest, thus improving the accuracy.

The gyroscope sensor detects the number of vibrations when the slope is greater than 80, and transmits the detected number of vibrations to the control chip in the electric control module. When the gyroscope sensor detects that the number of vibrations when the slope is greater than 80 exceeds the setting value stored in the memory, the control chip in the electric control module controls the power mechanism on the electric table to make a rebound action.

To improve the anti-pinch effect, the sensor unit 1 is provided with a current sensor in addition to using the vibration sensor unit. The current sensor mainly detects the current when the power mechanism on the electric table moves, and transmits the detected data to the control chip in the electric control module. When the current sensor detects that the current variable of the power mechanism on the electric table exceeds the setting value, the control chip in the electric control module controls the power mechanism on the electric table to make a rebound action. After any one of the vibration sensor unit and the current sensor detects the data exceeding the setting value, the control chip in the electric control module will control the power mechanism on the electric table to make a rebound action. By setting, the control chip in the electric control module can control the power mechanism on the electric table to make a rebound action only after the vibration sensor unit and the current sensor simultaneously detect the data exceeding the setting value.

The vibration sensor unit detects the vibration of the whole electric table body and the electric table body comprises a table top and table legs. Meanwhile, to improve the vibration amplitude that can be detected, the acceleration sensor and the gyroscope sensor are installed on a small board 2, and the small board 2 is vertically arranged on the circuit board 3 where the electric control module is located. The tests show that the ability of gyroscope sensor to detect the vibration amplitude can be improved by 1.5 times without increasing the cost basically. The cost for the small board 2 is less than RMB 0.1. With labor and other materials, the cost will not exceed RMB 1, but the effect is actually increased by 1.5 times. Considering that the electric control module and the sensor unit 1 need to be installed in the control box of the electric table, the small board 2 is 3~4 cm high.

Combined with specific operation, the method for controlling safe operation of an electric table is introduced. After power-on, the anti-pinch parameters are set according to the user's own usage habits or usage environment. For example, if the gyroscope sensor detects the number of vibrations when the slope is greater than 80 and it is set at three, the rebound action will be started after the number of vibrations is three. If the user cannot set or is not happy to set the number of vibrations, the user does not need to set it, and the program will run based on the preset value. Generally, the electric control module and the sensor unit 1 are in a standby state. The output of the acceleration sensor is used to correct the output of the gyroscope sensor, so that the output data of the gyroscope sensor is stable within the preset range at rest, thus improving the accuracy. To save electricity, the correction process of acceleration sensor can be periodic, such as once a day or once a week, and the specific parameters are stored in the memory. The electric control module activates the gyroscope sensor in the sensor unit 1 when the electric table is raised or lowered, and the gyroscope sensor detects the vibration amplitude of the electric table during the raising or lowering and records the number of vibrations when the vibration amplitude exceeds the slope greater than 80. When the recorded number of vibrations is greater than the default setting value or self-set setting value, the control chip in the electric control module controls the power mechanism on the electric table to make a rebound action in the opposite direction when the electric table is raised or lowered. The reference object of the rebound action is the table top of the electric table. The power mechanism on the electric table drives the electric table to move 1~6 cm in the opposite direction when the electric table is raised or lowered, and then makes it stop running. The rebound distance can be set, and usually the default setting value is 3 cm.

Inspired by the above ideal embodiments of the invention, the relevant workers could make diversified changes and amendments without deviating from the scope of the technical idea of the invention through the above description completely. The technical scope of the invention is not limited to the content of the specification, and must be determined according to the scope of claims.

What is claimed is:

1. A method for controlling safe operation of an electric table, comprising:
    a). recalling the default setting value or self-set setting value of a sensor unit stored in a memory after power-on, wherein the sensor unit comprises an acceleration sensor and a gyroscope sensor, and the acceleration sensor and the gyroscope sensor are configured to work simultaneously;
    b). keeping an electric control module and the sensor unit in a standby state;
    c). activating the sensor unit by the electric control module when the electric table is raised or lowered, detecting a vibration amplitude of the electric table by the sensor unit during the electric table is raised or lowered, recording, by the sensor unit, the number of vibrations when the vibration amplitude exceeds the setting value, and controlling, by the electric control module, a power mechanism on the electric table to make an anti-pinch action when the recorded number of vibrations is greater than the default setting value or self-set setting value;
    and, the method further comprising: correcting output of the gyroscope sensor by output of the acceleration sensor when the electric control module and the sensor unit are in the standby state, so that output data of the gyroscope sensor is stable within a preset range at rest.

2. The method for controlling safe operation of an electric table according to claim 1, wherein the anti-pinch action specifically means that the electric control module controls the power mechanism on the electric table to make a rebound action in the opposite direction when the electric table is raised or lowered, and the rebound action means that the power mechanism on the electric table drives the electric table to move in the opposite direction when the electric table is raised or lowered for a certain distance.

3. The method for controlling safe operation of an electric table according to claim 2, wherein a reference object of the rebound action is a table top of the electric table, and the power mechanism drives the table top to rebound by 1~6 cm during the rebound action.

4. The method for controlling safe operation of an electric table according to claim 1, wherein the gyroscope sensor measures a physical quantity, i.e., rotational angular velocity when deflecting and tilting, and transmits the measured data to the electric control module.

5. The method for controlling safe operation of an electric table according to claim 4, wherein the sensor unit further comprises a current sensor, the current sensor detects the current of the power mechanism on the electric table and transmits the detected data to the electric control module, and when the current sensor detects that the current variable of the power mechanism on the electric table exceeds the setting value, the electric control module controls the power mechanism on the electric table to make an anti-pinch action.

6. The method for controlling safe operation of an electric table according to claim 4, wherein the gyroscope sensor detects the number of vibrations when the slope is greater than 80, and transmits the detected number of vibrations to the electric control module, and when the gyroscope sensor detects that the number of vibrations when the slope is greater than 80 exceeds the setting value, the electric control module controls the power mechanism on the electric table to make an anti-pinch action.

7. The method for controlling safe operation of an electric table according to claim 4, wherein the sensor unit is set to realize the anti-pinch action after the gyroscope sensor and/or the current sensor in the sensor unit detects the sudden change signal.

8. The method for controlling safe operation of an electric table according to claim 1, wherein the sensor unit detects the vibration of an electric table body and the electric table body comprises a table top and table legs.

9. The method for controlling safe operation of an electric table according to claim 1, wherein the correcting output of the gyroscope sensor, comprises:

correcting a reference value of vibration amplitude when the electric control module and the sensor unit are in the standby state.

10. The method for controlling safe operation of an electric table according to claim 1, wherein the output of the gyroscope sensor is periodically corrected by the output of the acceleration sensor.

11. A unit for controlling safe operation of an electric table, comprising an electric control module for controlling raising or lowering of the electric table and a sensor unit for detecting data during the raising or lowering of the electric table;

wherein the sensor unit is configured to transmit detected data to the electric control module, and the electric control module is configured to control a power mechanism on the electric table to make an anti-pinch action after processing received data;

wherein the sensor unit comprises a vibration sensor unit including an acceleration sensor and a gyroscope sensor, and the acceleration sensor and the gyroscope sensor are configured to work simultaneously; and the vibration sensor unit is configured to detect vibration data during the raising or lowering of the electric table and transmit the detected data to the electric control module;

wherein the detected data comprise the number of vibrations when a vibration amplitude of the electric table during the raising or lowering exceeds a setting value;

wherein the acceleration sensor is configured to correct output of the gyroscope sensor when the electric control module and the sensor unit are in a standby state, so that output data of the gyroscope sensor is stable within a preset range at rest; and the output of the gyroscope is specifically corrected by correcting a reference value of vibration amplitude.

12. The unit for controlling safe operation of an electric table according to claim 11, wherein the electric control module comprises a control chip and a memory, the memory is electrically connected with the control chip and transmits the data stored in the memory to the control chip, and the control chip compares the data in the memory with the received data detected by the sensor unit, and then sends corresponding instructions to the power mechanism on the electric table.

13. The unit for controlling safe operation of an electric table according to claim 11, wherein the acceleration sensor and the gyroscope sensor are installed on a small board, and the small board is vertically arranged on a circuit board where the electric control module is located.

14. The unit for controlling safe operation of an electric table according to claim 11, wherein the acceleration sensor is specifically configured to periodically correct the output of the gyroscope sensor when the electric control module and the sensor unit are in the standby state.

* * * * *